(12) United States Patent
McClung et al.

(10) Patent No.: US 7,270,332 B2
(45) Date of Patent: Sep. 18, 2007

(54) ACTIVITY SETS

(75) Inventors: John Michael McClung, Spring, TX (US); Karen Therese McClung, Spring, TX (US); Guy L. McClung, III, Spring, TX (US)

(73) Assignee: Go-Whiz-It, Inc., Spring, TX (US)

( * ) Notice: Subject to any disclaimer, the term of this patent is extended or adjusted under 35 U.S.C. 154(b) by 0 days.

(21) Appl. No.: 11/342,196

(22) Filed: Jan. 27, 2006

(65) Prior Publication Data

US 2006/0202424 A1 Sep. 14, 2006

Related U.S. Application Data

(60) Division of application No. 10/664,252, filed on Sep. 17, 2003, now abandoned, which is a continuation-in-part of application No. 10/039,489, filed on Oct. 28, 2001, now abandoned, which is a continuation-in-part of application No. 09/863,634, filed on May 23, 2001, now abandoned, which is a continuation-in-part of application No. 09/592,976, filed on Jun. 12, 2000, now abandoned, which is a continuation-in-part of application No. 09/144,002, filed on Aug. 31, 1998, now Pat. No. 6,073,588, which is a division of application No. 08/711,259, filed on Sep. 9, 1996, now Pat. No. 5,799,616, which is a continuation-in-part of application No. 08/338,675, filed on Nov. 14, 1994, now Pat. No. 5,553,570, said application No. 10/664,252 and a continuation-in-part of application No. 09/953,094, filed on Sep. 14, 2001, now Pat. No. 6,755,711, and a continuation-in-part of application No. 09/871,170, filed on May 31, 2001, now Pat. No. 6,585,551.

(51) Int. Cl.
*A63B 67/06* (2006.01)
(52) U.S. Cl. ...................................................... 273/338
(58) Field of Classification Search ......... 273/336–339
See application file for complete search history.

(56) References Cited

U.S. PATENT DOCUMENTS

| | | | |
|---|---|---|---|
| 669,617 A | 3/1901 | Butterly | |
| 1,029,069 A | 6/1912 | Lazaron | |
| 1,518,981 A | 12/1924 | Hammond-Knowlton | |
| 1,629,907 A | 5/1927 | Dwyer | 473/190 |
| 2,032,531 A | 3/1936 | Eaton | |
| 2,068,306 A | 1/1937 | Weinberg | 473/572 |
| 2,083,000 A | 6/1937 | Bennard | |
| 2,134,971 A | 11/1938 | Guyer | 229/8 |
| 2,197,451 A | 4/1940 | Eaton | |
| 2,432,824 A | 12/1947 | Shelter | 124/26 |
| 2,636,312 A | 4/1953 | Martin | |

(Continued)

*Primary Examiner*—Mark S Graham
(74) *Attorney, Agent, or Firm*—Guy McClung (57) ABSTRACT

A play activity set including a target at which objects may be directed, a plurality of objects for throwing at the target, the plurality of objects including at least a first object with a first opening therethrough and a second object with a second opening therethrough, in one particular aspect the first opening different in size than the second opening, the target made from box material from at least one box, the target including an upright portion and a first projection projecting from the upright portion, and the first opening and the second opening each sufficient to encompass the first projection when thrown at the target.

11 Claims, 7 Drawing Sheets

U.S. PATENT DOCUMENTS

| | | | |
|---|---|---|---|
| 2,744,355 A | 5/1956 | DelMar | |
| 2,822,176 A | 2/1958 | Robes | 473/588 |
| 3,100,642 A | 8/1963 | Goldstein | 206/459.5 |
| 3,155,392 A | 11/1964 | Ruderian | 446/79 |
| 3,233,356 A | 2/1966 | Thompson | |
| D209,526 S | 12/1967 | Dunbar | D34/15 |
| 3,359,678 A | 12/1967 | Headrick | |
| 3,573,869 A | 4/1971 | Duckett | 273/106 |
| 3,711,095 A | 1/1973 | Todd | 273/348 |
| 3,724,122 A | 4/1973 | Gillespie, Jr. | 46/74 D |
| 3,843,124 A | 10/1974 | Davis | 273/398 |
| 3,855,728 A | 12/1974 | Hynds | 46/74 D |
| 3,942,798 A | 3/1976 | Koski | 273/394 |
| 3,971,156 A | 7/1976 | Lamlee | 46/1 L |
| 4,039,189 A | 8/1977 | Headrick et al. | 273/400 |
| 4,087,576 A | 5/1978 | Patterson | 428/8 |
| 4,112,612 A | 9/1978 | Woods | 46/74 D |
| D253,659 S | 12/1979 | Weeks | D19/26 |
| 4,176,843 A | 12/1979 | DeWitt, Jr. | 273/106 B |
| 4,207,702 A | 6/1980 | Boatman et al. | 46/74 D |
| 4,330,130 A | 5/1982 | Carr | 273/393 |
| 4,373,734 A | 2/1983 | Frank | 473/471 |
| 4,448,418 A | 5/1984 | McNeill | 273/123 A |
| 4,486,023 A | 12/1984 | Tomoff | 273/348 |
| 4,529,390 A | 7/1985 | Levy et al. | 446/220 |
| 4,648,548 A | 3/1987 | Shin | 229/8 |
| 4,736,955 A | 4/1988 | Pollock | 273/336 |
| 4,802,875 A | 2/1989 | Cunningham | 446/46 |
| 4,891,482 A | 1/1990 | Jaeger et al. | 219/10.55 |
| 4,919,083 A | 4/1990 | Axelrod | 119/29 |
| 4,919,326 A | 4/1990 | Deiger | 229/109 |
| 4,927,161 A | 5/1990 | Brenneman | 273/402 |
| 4,936,590 A | 6/1990 | Palmer | 273/402 |
| 4,940,441 A | 7/1990 | Novinsky | 446/46 |
| 4,949,979 A | 8/1990 | Wheatcroft | 273/389 |
| 4,974,858 A | 12/1990 | Knowlton | 273/401 |
| 4,989,880 A | 2/1991 | Gettemeier et al. | 273/336 |
| 5,020,808 A | 6/1991 | Richards | 273/425 |
| 5,048,845 A | 9/1991 | Dunipace | 273/400 |
| 5,056,797 A | 10/1991 | Hockert et al. | 273/402 |
| 5,060,955 A | 10/1991 | Bible | 273/400 |
| 5,173,070 A | 12/1992 | Gould | 446/79 |
| 5,222,657 A | 6/1993 | Holland, Jr. | 229/103 |
| 5,232,226 A | 8/1993 | Glickson | 473/510 |
| 5,246,161 A | 9/1993 | Kapp | 229/103 |
| 5,263,819 A | 11/1993 | O'Leary et al. | 446/48 |
| 5,282,635 A | 2/1994 | Hopkins | 273/342 |
| 5,303,931 A | 4/1994 | Brown | 273/348 |
| 5,316,310 A | 5/1994 | Nicholas et al. | 273/317 |
| 5,318,307 A | 6/1994 | Bouchard et al. | 273/348.4 |
| 5,318,308 A | 6/1994 | Holms | 273/348.4 |
| 5,332,230 A | 7/1994 | Benedict | 473/594 |
| 5,351,967 A | 10/1994 | Yang | 273/348.2 |
| 5,358,440 A | 10/1994 | Zheng | 446/48 |
| 5,382,028 A | 1/1995 | Sciandra et al. | 273/401 |
| 5,419,566 A | 5/1995 | Byrd | 273/402 |
| 5,423,552 A | 6/1995 | English | 273/342 |
| 5,465,961 A * | 11/1995 | Burtch | 273/317.3 |
| 5,480,334 A | 1/1996 | Wilson et al. | 446/46 |
| 5,531,624 A | 7/1996 | Dunipace | 446/46 |
| 5,533,735 A | 7/1996 | Denney | 473/470 |
| 5,540,610 A | 7/1996 | Sneddon | 446/46 |
| 5,553,327 A | 9/1996 | Koecher et al. | 2/200.3 |
| 5,553,570 A | 9/1996 | VanNatter, III et al. | 119/709 |
| 5,586,716 A | 12/1996 | Correll | 229/110 |
| 5,595,339 A | 1/1997 | Correll | 229/109 |
| 5,655,944 A | 8/1997 | Fusselman | 446/67 |
| 5,657,562 A | 8/1997 | Desormeaux | 40/124.01 |
| D388,134 S | 12/1997 | Dunipace | D21/86 |
| 5,702,054 A | 12/1997 | Philips et al. | 229/110 |
| 5,713,509 A | 2/1998 | Correll | 229/109 |
| 5,776,021 A | 7/1998 | Rakonjac | 473/588 |
| 5,799,938 A | 9/1998 | Lewis | 273/118 R |
| 5,833,130 A | 11/1998 | Correll | 229/108 |
| 5,863,265 A | 1/1999 | Acton | 473/470 |
| 5,954,337 A * | 9/1999 | Cunningham | 273/338 |
| 6,016,951 A | 1/2000 | Correll | 229/101 |
| D420,583 S | 2/2000 | Cooper, Jr. | D9/422 |
| 6,022,260 A | 2/2000 | Fritzel | 446/93 |
| 6,065,669 A | 5/2000 | Correll | 229/112 |
| 6,068,114 A | 5/2000 | Zimmerman et al. | 206/216 |
| 6,073,588 A | 6/2000 | McClung, III et al. | 119/709 |
| 6,120,344 A | 9/2000 | Brown | 446/388 |
| 6,136,400 A | 10/2000 | Katayose et al. | 428/42.1 |
| 6,173,957 B1 | 1/2001 | James, Sr. | 273/440 |
| 6,206,277 B1 | 3/2001 | Correll | 229/101 |
| 6,241,251 B1 | 6/2001 | Trifonov | 273/339 |
| 6,247,989 B1 | 6/2001 | Neff | 446/46 |
| D466,562 S | 12/2002 | Peterson | D21/443 |
| 6,585,551 B2 | 7/2003 | McClung et al. | 446/46 |
| 6,755,711 B2 | 6/2004 | McClung et al. | 446/46 |

* cited by examiner

ACTIVITY SETS

RELATED APPLICATIONS

This is a division of U.S. application Ser. No. 10/664,252 filed Sep. 17, 2003 now abandoned which is a continuation-in-part of U.S. application Ser. No. 10/039,489 filed Oct. 28, 2001 now abandoned which is a continuation-in-part of U.S. application Ser. No. 09/863,634 filed May 23, 2001, now abandoned which is a continuation-in-part of U.S. application Ser. No. 09/592,976 filed Jun. 12, 2000 now abandoned which is a continuation-in-part of U.S. application Ser. No. 09/144,002 filed Aug. 31, 1998 issued as U.S. Pat. No. 6,073,588 on Jun. 13, 2000, which is a division of U.S. application Ser. No. 08/711,259 filed Sep. 9, 1996 and issued as U.S. Pat. No. 5,799,616 on Sep. 1, 1998 which is a continuation-in-part of U.S. application Ser. No. 08/338,675 filed Nov. 14, 1994 and issued as U.S. Pat. No. 5,553,570 on Sep. 10, 1996; and this is a continuation-in-part of U.S. application Ser. No. 09/953,094 filed Sep. 14, 2001 now U.S. Pat. No. 6,755,711 and 09/871,170 filed May 31, 2001 now U.S. Pat. No. 6,585,551 all said applications as filed and all said patents as issued incorporated fully herein for all purposes and from all of which the present invention claims priority under the Patent Laws.

BACKGROUND OF THE INVENTION

1. Field of the Invention

This invention is directed to activity sets, activity sets with targets that have one or more projections at which objects are thrown, and to discs, flying discs, and activities and games with them.

2. Description of Related Art

The prior art discloses a wide variety of activity sets and play sets that include a target and things to be thrown at the target.

SUMMARY OF THE PRESENT INVENTION

The present invention, in at least certain aspects, teaches a play activity set with a target having one or more projections and two or more objects with openings therethrough which are to be thrown at the target so that, if thrown successfully, the thrown object comes to a stop with its opening around a projection. In one aspect, the thrown objects have openings of different sizes.

The present invention, in at least certain aspects and embodiments, discloses methods for engaging in an activity, the activity to be engaged in by a plurality of players, each player provided with at least one disc with identifying indicia, the methods in certain aspects including: each player throwing at least one disc at a target, each disc having identifying indicia for identifying the player throwing said flying disc; scoring for each player based on a final resting location of said at least one disc; the at least one disc is having an aerodynamic flying disc and having a disc body with an annular rim with a downturned lip and having an airfoil profile that creates lift in flight, and the at least one disc having a score value indicator which corresponds to a number of points that can be scored with the disc.

The present invention discloses, in at least certain embodiments, a method for engaging in an activity, the activity to be engaged in by a plurality of players, each player provided with at least one disc with identifying indicia, the method including each player throwing at least one disc at a target, each disc having identifying indicia for identifying the player throwing said disc, and scoring for each player based on a final resting location of said at least one disc. In one aspect in such a method the plurality of players are divided into at least two opposed teams and, optionally, each team alternates on offense and defense, a team on offense attempting to score and a team on defense attempting to prevent the other team from scoring. A score may be achieved for a disc that hits the target. The target may be a container and the players attempt to throw the at least one disc into the container. The at least one disc may be a plurality of discs and, optionally, a player may be allowed to retrieve a disc that fails to hit the target and again throw said disc at the target.

In certain aspects, the present invention discloses a method for engaging in an activity, the activity to be engaged in by at least two players or teams, the players, optionally, divided into a first team and a second team each team with at least one player, the first team provided with at least one disc, the method including at least one player of the first team throwing the at least one disc at a player of the second team; and, optionally, at least one player of the second team having at least one disc and throwing it at a player of the first team. Such a disc may have, according to the present invention, a soft rim or the entire disc may be soft.

In one embodiment the present invention discloses a series of devices of different colors and/or with different indicia (e.g. letters, symbols, or numbers thereon). In one method according to this invention for using such devices an item, a treat or food item is placed in only one of the devices and an animal (or person) is asked to retrieve that device according to its indicia from among a plurality of devices.

Certain embodiments of this invention are not limited to any particular individual feature disclosed here, but include combinations of them distinguished from the prior art in their structures and functions. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods which do not depart from the spirit and scope of the present invention.

The present invention recognizes and addresses the previously-mentioned problems and long-felt needs and provides a solution to those problems and a satisfactory meeting of those needs in its various possible embodiments and equivalents thereof. To one of skill in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or legally equivalent embodiments.

FIG. 3C is a top view, and FIG. 3D is a bottom view of the disc of FIG. 3A.

DESCRIPTION OF EMBODIMENTS PREFERRED AT THE TIME OF FILING FOR THIS PATENT

Figure 8:
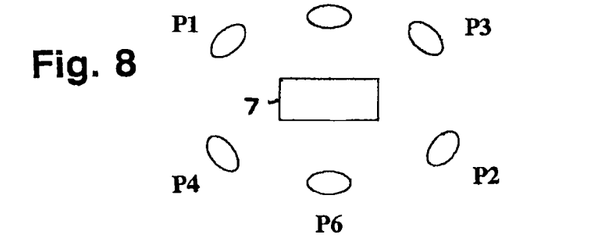
FIG. 8 is a schematic view of an arrangement for engaging in activity according to the present invention.

One method for playing a game according to the present invention pits multiple teams (two, three, four, or more teams) of players against each other. Each team attempts to throw plates, discs, flying discs, flat and/or cardboard items to a target and/or target container. The plates, etc. of each team are identified by an identifying team color, symbol, name, etc. and/or are each marked with a scoring indicator, e.g., but not limited to, a numerical value. FIG. 8 shows a method in which three teams attempt to throw plates, etc. into a target container 7.

As shown in FIG. 8, there are three team, teams A, B, and C. Each member of team A (players P1 and P2), team B (players P3 and P4) and team C (players P5 and P6) has 1 to 10 (or more) throwing items, e.g., but not limited to, discs or flying discs. In one aspect all of a team's items (e.g. discs) are of the same color and/or each team member wears a team identifier [e.g. a belt, shirt, shoes, pants, and/or hat; e.g. of the same color as the team's items (e.g. discs)]. The items (e.g. discs) may each have a scoring indicator thereon which corresponds to a scoring or point value for the items (e.g. discs), e.g., but not limited to, numerical values.

In one particular aspect each team has ten flying discs, with values from 10 to 100 in increments of 10. Points are scored by throwing a disc into the target container 7. For example, in one game team A's players successfully throw flying discs with point values 20, 30, 70 and 100 into the target container 7. Team B succeeds in throwing discs with values 10, 40, 60 and 90 into the target container and team C gets discs with values 30, 50, 70, 80 and 100 into the container. Team scores for this game are: Team A-220 points; Team B-200 points; Team C-230 points. Team C wins. Alternatively, once all discs have been thrown once, any disc that did not enter the container (or hit the target) may be retrieved and a second round of throwing ensues.

Throwing round(s) or period(s) can be timed so that, e.g., upon the expiration of a set time period, e.g. thirty or sixty seconds, no more throwing is allowed. It is within the scope of this invention for this game (as is the case for any team game or activity according to the present invention) that two, three, four or more teams may compete. Also for any team game according to the present invention any one or more teams may be on defense [trying to prevent other team(s) from scoring] and any one or more teams may be on offense. For any such game any throwing items or discs disclosed or referred to herein may be used. Also, instead of teams, any such game may be played by two or more individual players. In one aspect all players are located equidistant from a target or target container for throwing items in any attempt to score.

Instead of a target or container 7, a goal like a soccer goal or basket ball goal may be used and, optionally, players and/or teams seeking to score may be arrayed in front of (i.e., all on one side of) the goal. Optionally, one player or team may be positioned to defend the goal to try to stop thrown items or discs from scoring. Optionally, if a defender catches an item or disc in the air, the player or the player's team can score. Player(s) and or team(s) can alternate on offense and defense.

Figure 9:
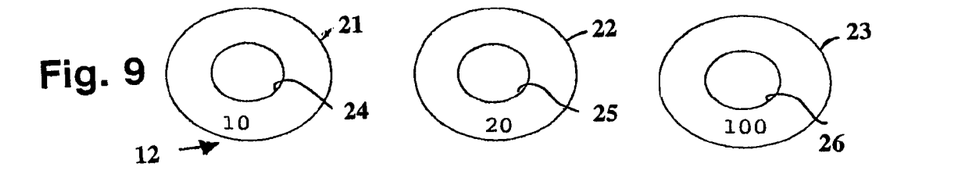
FIG. 9 is a top view of discs according to the present invention.

A set 12 of throwing discs shown in FIG. 9 (which may be flying discs, flat discs, any disc according to the present invention, any disc referred to or disclosed herein) includes discs 21, 22, 23 each, respectively with openings 24, 25, 26 therethrough, and each, optionally, with a scoring value indicated thereon; in this case 10, 20 or 100 points. It is within the scope of this invention to have two or more than three discs like the discs 21-23. A set 12 (or two or more than three) of such discs may be used in any suitable game or activity referred to or disclosed herein).

Figure 10:
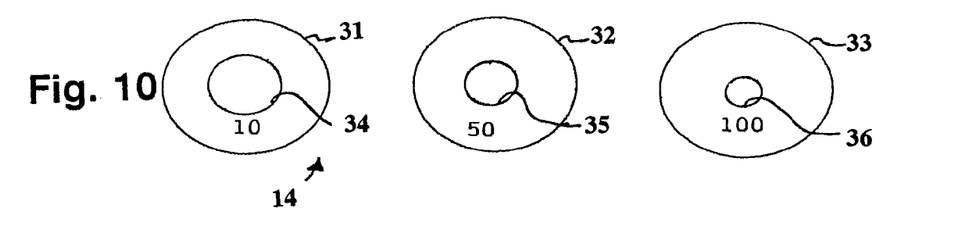
FIG. 10 is a top view of discs according to the present invention.

A set 14 of throwing discs shown in FIG. 10 (which may be flying discs, flat discs, any disc according to the present invention, any disc referred to or disclosed herein) includes discs 31, 32, 33 each, respectively with openings 34, 35, 36 therethrough of different size, and each, optionally, with a scoring value indicated thereon; in this case 10, 50 or 100 points. It is within the scope of this invention to have two or more than three discs like the discs 31-33. A set 14 (or two or more than three) of such discs may be used in any suitable game or activity referred to or disclosed herein).

Figure 11:
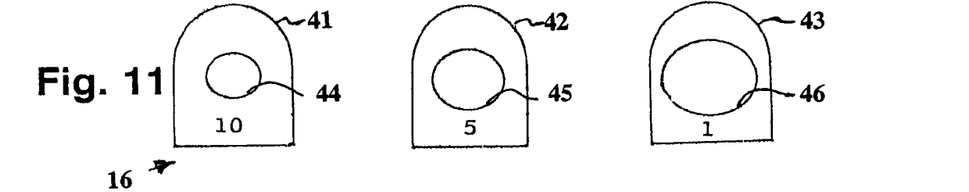
FIG. 11 is a front view of targets according to the present invention.

FIG. 11 shows a series of targets or containers 16 according to the present invention that includes targets 41, 42, 43 each, respectively, with an opening 44, 45, 46, each of different size, for receiving and/or through which an item or disc is to be thrown to score in a game or activity according to the present invention. Optionally, each target 41-43 may have a scoring value (values 1, 5 and 10 shown) so that an item or disc passing therethrough or thereinto merits that score (and, in one aspect, a score value on the item thrown is multiplied by the numeric value on the target). Higher scores may be awarded for targets with smaller openings. It is within the scope of this invention to have two or more than three targets 41-43. A set 16 (or two or more than three such targets) may be used in any suitable game or activity referred to or disclosed herein.

Figure 12:
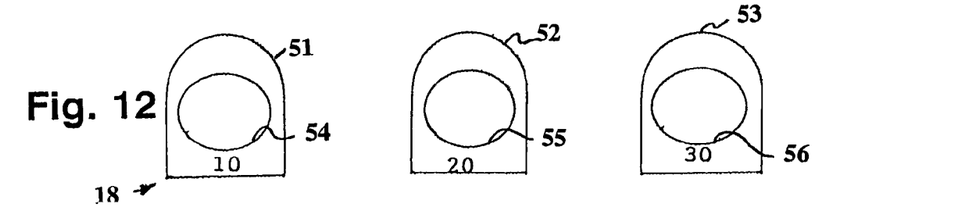
FIG. 12 is a front view of targets according to the present invention.
Figure 13A:
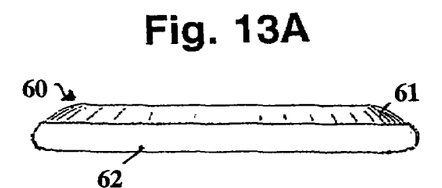
FIG. 13A is a side view of a flying disc according to the present invention.
Figure 13B:
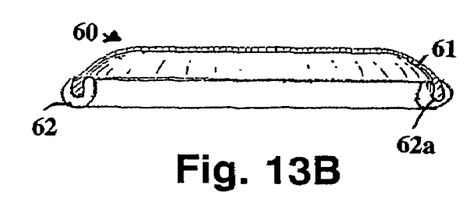
FIG. 13B is a cross-section view of the disc of FIG. 13A.
Figure 13C:
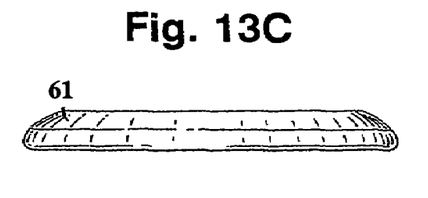
FIG. 13C is a side view of part of the disc of FIG. 13A.
Figure 13D:
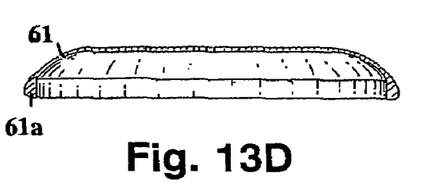
FIG. 13D is a cross-section view of the part of the disc of FIG. 13C.

FIG. 12 shows a series of targets or containers 18 according to the present invention that includes targets 51, 52, 53 each, respectively, with an opening 54, 55, 56 of similar size for receiving and/or through which an item or disc is to be thrown to score in a game or activity according to the present invention. Optionally, each target 51-53 may have a scoring value so that an item or disc passing therethrough or thereinto merits that score (and, in one aspect, a score value on the item thrown is multiplied by the numeric value on the target). It is within the scope of this invention to have two or more than three targets 41-43. A set 40 (or two or more than three such targets) may be used in any suitable game or activity referred to or disclosed herein.

In one game or activity according to the present invention one or more players and/or one or more teams attempts to hit one or more other players and/or members of one or more other teams with a plurality of throwing items or discs (which according to the present invention may be any throwing item, flying disc, or disc referred to or disclosed herein). A player at whom an item or disc is thrown attempts to avoid being hit by the item or disc. A player or team scores by hitting an opposing player with an item or disc. The score can correspond to the number of times a player is hit by a thrown item or disc. A score can be determined and/or enhanced or multiplied by a scoring value on a disc. Optionally a player (or the player's team) at whom an item or disc thrown at the player can score by catching the item or disc before it hits the player. Any number of players and/or teams can be on offense or defense in such a game or activity, i.e., throwing or being thrown at.

FIGS. 13A-13D show a flying disc 60 according to the present invention which has a body 61 and an outer soft rim 62 that is connected to, attached to, or formed integrally of the body 61. The soft rim 62 may be made of any suitable soft material, e.g., but not limited to, soft foam, plastic, cloth, or an inflated member. As shown the soft rim 62 is shaped with a groove 62a that corresponds to the shape of a lower lip 61a of the body 61. The rim 62 may be attached to the body 62 with a friction fit, with a press fit, and/or with glue or adhesive; or, alternatively, the rim 62 may be removable from the body 61. For each of a plurality of rims 62, rims may be of different colors and/or may bear other different identifying and/or scoring indicia. In certain aspects the rims 62 are sufficiently soft that the discs do not injure a person struck by the discs. Alternatively, a soft rim may be provided that encircles a disc or flying disc without part of it projecting under the disc body.

Figure 14:
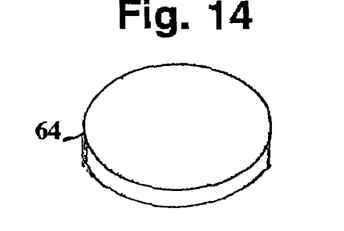
FIG. 14 is a perspective view of a disc according to the present invention.
Figure 15:
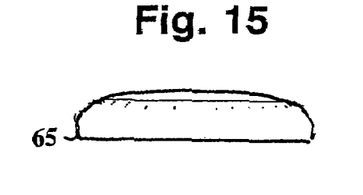
FIG. 15 is a side view of a disc according to the present invention.

FIG. 14 shows a disc 64 according to the present invention which is made of foam or other similar soft material. FIG. 15 shows a flying disc 65 which is generally circular viewed from above which has a lip (not shown) like the lip 61a, FIG. 13D. The disc is made of foam or other similar soft material.

Figure 16A:
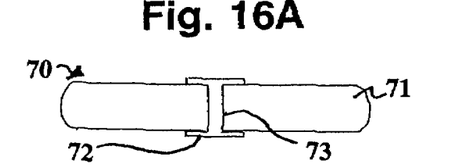
FIG. 16A is a cross-section view of a disc according to the present invention.
Figure 16B:
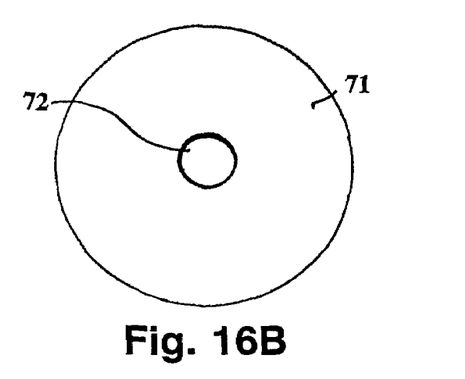
FIG. 16B is a top view of the disc of FIG. 16A.
Figure 16C:
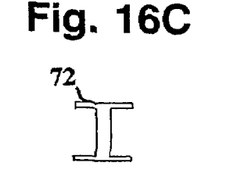
FIG. 16C is a side cross-section view of part of the disc of FIG. 16A.
Figure 16D:
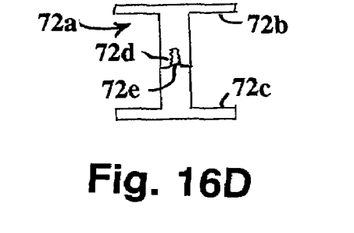
FIG. 16D is a cross-section view of a weight for a disc like the disc of FIG. 16A.

FIGS. 16A and 16B show a throwing item 70 which has a soft body 71 and, optionally, an inner and/or central weight member 72. The soft body 71 may be flat or it may be fashioned, configured and shaped as a flying disc. The weight member has sufficient mass so that the item 70 can be effectively and accurately thrown a desired distance. It is within the scope of this invention to use two, three, four, or more such weight members and to locate them on or in the body of a disc as desired. Also, a weight member need not, according to the present invention, extend all the way through a disc body. A disc body may be sufficiently flexible so that a weight as shown in FIG. 16A can be inserted through an opening 73 as is shown in the disc body 71; or, as shown e.g. in FIG. 16D, a weight member 72a may have parts 72b and 72c that fit or mate together. Any suitable mating structure may be used within the scope of this invention, e.g., but not limited to friction it, press fit, or mating threaded structure like the structure 72d, 72e of FIG. 16D, and/or adhesive, tape or glue may be used to hold parts together and/or to a disc body.

Figure 17:
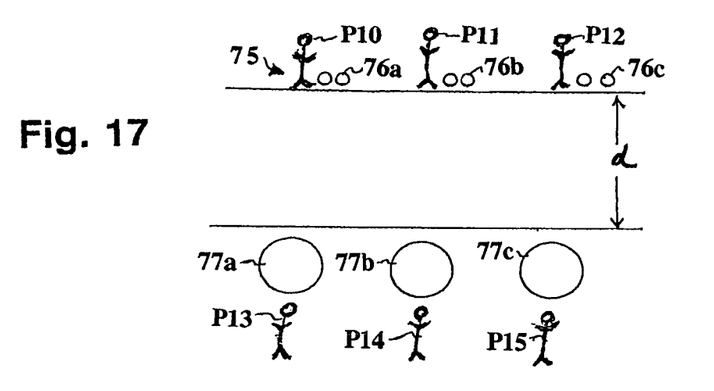
FIG. 17 is a schematic view of an arrangement for engaging in activity according to the present invention.

In certain aspects any flying disc or disc disclosed or referred to herein, or a plurality of them, or a flying disc 60 (or discs) and/or a throwing item 70 (or items) are used in a game or activity according to the present invention as described above in which an item or disc is thrown to hit an opposing player. FIG. 17 shows a system 75 in which players P10, P11, and P12 (who may all be on one team or who may play as individuals) throw one or more discs 76a, 76b, 76c, respectively, at containers 77a, 77b, 77c, respectively, which may be a pre-set distance d away from the throwing players. Scoring is based on the number of discs successfully thrown into a container; the number of discs within a certain distance of a container although they did not enter a container; and/or scores indicated on the discs themselves. Any disc or flying disc disclosed or referred to herein may be used. In certain aspects, each player P10, P11, P12 has a corresponding teammate P13, P14, P15, respectively, who is allowed to return thrown discs to a teammate, discs which failed to enter a container, so that the original throwing player may have a second (or third, or fourth, etc.) chance to throw a disc successfully into a container. Optionally, e.g., player P13 may be allowed to secure a disc thrown by player P11 and, instead of throwing it to player P11 for a re-throw, throw it to designated area from which player P11 must retrieve it prior to again attempting to throw it into a container to score; thus a player at the location of the containers in this aspect must, if possible, return his corresponding teammate's discs for re-throwing, and try to prevent opposing players from getting the discs and throwing them away from the player who initially threw them. Optionally, players near the containers may be deleted and the players P10, P11, P12 are required to retrieve their own discs which failed to enter a container and return to the throwing position to re-throw such discs. Any suitable target or container may be used instead of the containers 77a, 77b, 77c. Optionally, players P13, P14, P15 may go to the throwing area with retrieved discs (that failed to enter a container when initially thrown) and attempt to throw them into a container. Any suitable number of players and/or teams may play a game as shown in FIG. 17.

Figure 18:
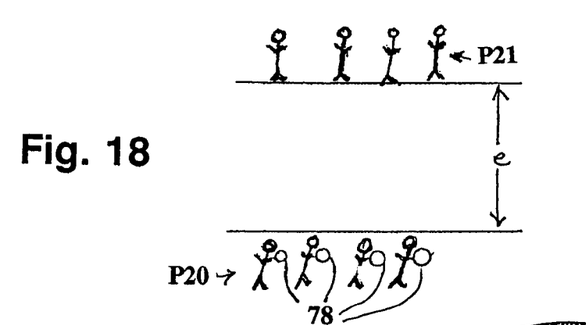
FIG. 18 is a schematic view of an arrangement for engaging in activity according to the present invention.

FIG. 18 illustrates an arrangement for a game or activity according to the present invention in which one or more players P20 attempt to hit one or more players P21 with a disc 78 or flying disc. Individuals or teams may play this game. Any disc or flying disc disclosed or referred to herein may be used, including, but not limited to, the items in FIGS. 13A-16B described above. Optionally, players may be required to be separated a distance e. Although players are shown as facing each other in a lined-up fashion, any configuration may be used, e.g., but not limited to, players to be hit in a circle and players throwing in the circle's center, or vice versa. Optionally, a player at whom a disc is thrown may retrieve it and attempt to hit an opposing player. Scoring may be based on hits and/or on scoring values indicated on a disc. Optionally, a player at whom a disc is thrown may score by catching the disc in the air before it strikes an object or player. Players P20 may begin with any number of discs. Optionally players P21 may also begin the game with discs to be thrown at the players P20 and both sides (or multiple teams) may throw discs simultaneously.

FIGS. 1A-1D show a throwing plate 260 according to the present invention with a body 262. The body 262 is made of material sufficiently flexible and resilient so that an item may be inserted through and releasably held in slitted portions, 263, 264, and 265. Any number of such slitted portions may be used positioned anywhere on the body 262, including in the top, bottom and/or side thereof.

Figure 1A:
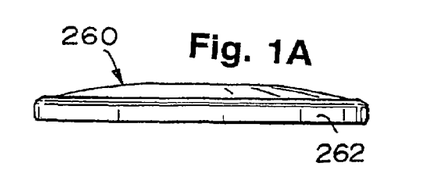
FIG. 1A is a side view of a flying disc according to the present invention.
Figure 1B:
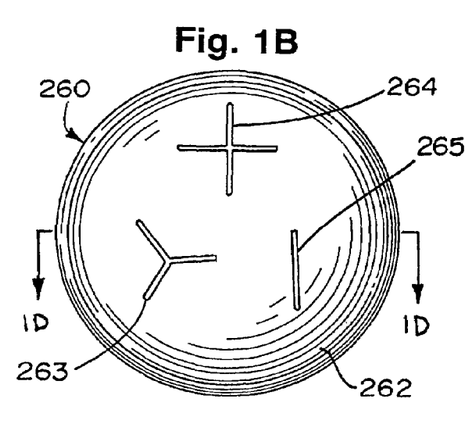
FIG. 1B is a top view and FIG. 1C is a bottom view of the disc FIG. 1A.
Figure 1C:
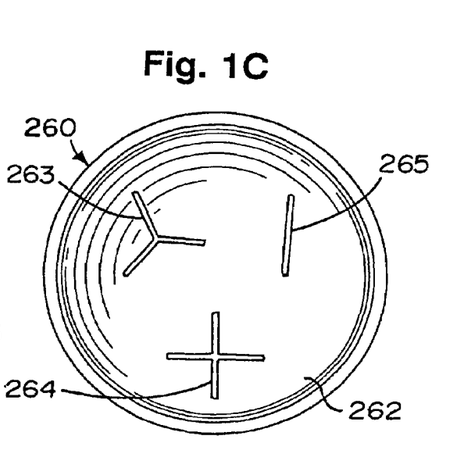
Figure 1D:
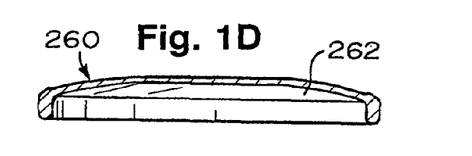
FIG. 1D is a cross-section view of the disc of FIG. 1A.
Figure 2A:
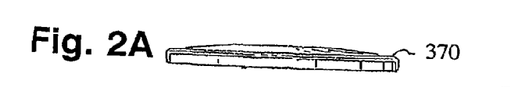
FIG. 2A is a side view of a flying disc according to the present invention.
Figure 2B:
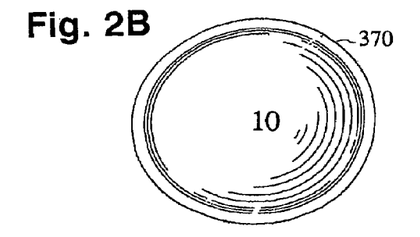
FIG. 2B-2E are bottom view of discs as in FIG. 2A.
Figure 2C:
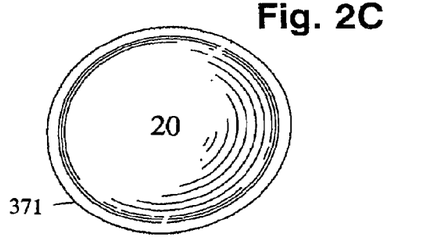
Figure 2D:
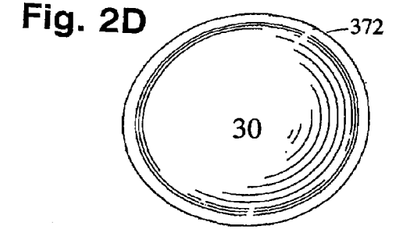
Figure 2E:
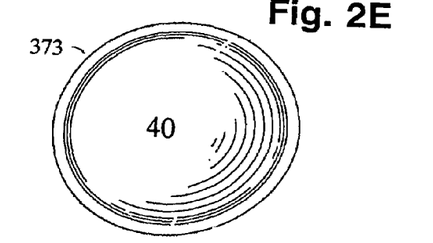

FIGS. 2A and 2B show a flying disc 370 according to the present invention which, as shown in FIG. 2B, bears the numeral "10" on its underside. FIGS. 2C-2E show additional discs 371-373 like the disc 370, but with different numerals. A plurality of discs such as those disclosed in FIGS. 2B-2E may be used, in one aspect according to the present invention, in a game in which one, two, or more persons (or a throwing apparatus) throw the discs at, (either simultaneously, randomly, or sequentially) to, or near one, two, three, four or more persons (players). The person or persons at whom the discs are thrown score points equal to the numeral on a disc they catch and/or for a disc they retrieve and/or acquire whether they catch it in the air or not. A game can be won in several ways: a player catches, retrieves, and/or acquires a sufficient number of discs to accumulate a pre-set point total; a player catches, acquires, and/or retrieves a disc with each different numeral; a player catches/retrieves a set number of discs whose point values are in sequence; and/or a player catches, acquires, and/or retrieves a set number or a particular set of discs which then qualifies the player to proceed from the area to which the discs are being thrown to a pre-set base or goal, and whichever player first achieves the base or goal is the winner. Alternatively, the players not only get points for disc catching acquisition and/or retrieval, they also earn points by then themselves throwing the discs at or into certain containers, goals, bases, or targets and score more points for their accuracy in such throwing. Any suitable scoring indicia (e.g., color, symbol, word, number) may be used on the discs and any disc disclosed herein may have the indicia for use in a game according to the present invention. It is also within the scope of the present invention for players to be associated in teams (two, three, four, or more teams) for any game according to the present invention.

Figure 3A:
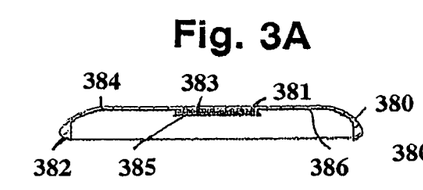
FIG. 3A is a side cross-section view of a flying disc according to the present invention.
Figure 3B:
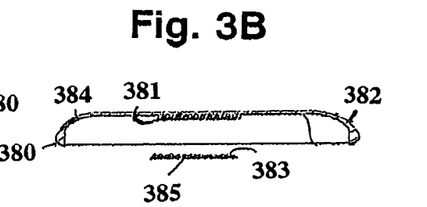
FIG. 3B is an exploded view of the disc of FIG. 3A.
Figures 3C, 3D:
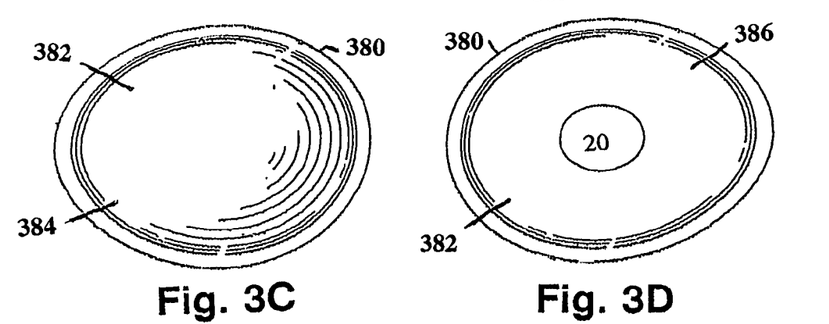

FIGS. 3A-3D show a flying disc 380 according to the present invention with a disc body 382 having a top 384 and a bottom 386. An amount 381 of releasably-cooperating or hook-and-loop fastener material is on the bottom 386 of the disc 380. Releasably secured to the material 381 is a patch 385 (e.g. of cloth, plastic cardboard paper, or other suitable material) 385 which has on its upper surface a corresponding amount of releasably cooperating or hook-and-loop fastener material 383 [including, but not limited to, VELCRO (™) material]. As shown in FIG. 3D, the patch 385 has the numeral "20" on it. FIG. 3E illustrates a plurality of patches 388, 389 (like the patch 385) and 385 with different numerals on them. Patches shown have a generally circular shape, but may be any desirable shape. A plurality of discs like the disc 380 with patches like the patch 385 may be used in any of the methods or games described herein.

Figure 4:
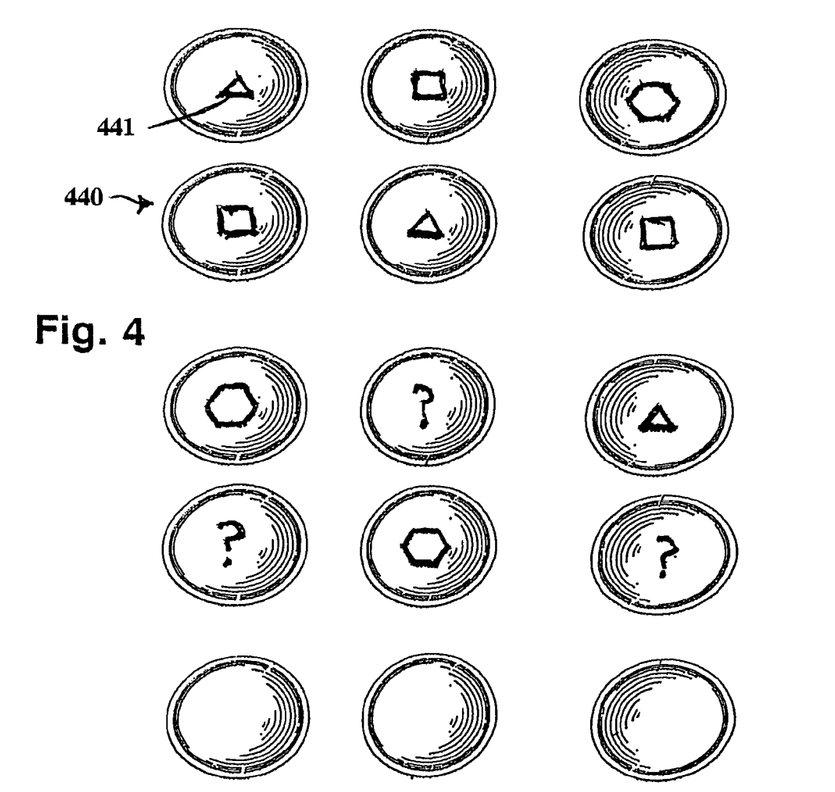
FIG. 4 is a top view of a plurality of flying discs according to the present invention.

FIG. 4 illustrates a plurality of flying discs 440 many of which have a specific identifying indicia 441 (triangle, square, hexagon or question mark) and some of, optionally, are "dummy" discs with no identifying indicia. Any indicia disclosed herein may be used anywhere on the disc bodies. Any game or activity disclosed herein may be played with the discs 440. In one aspect, one or more persons [individuals or on team(s)] throw the discs 440 (simultaneously, sequentially or randomly) to one or more persons [individuals or on team(s)]. In one aspect a player wins by catching and/or retrieving a set of the discs, i.e., one disc with each different indicia and/or all discs with one particular indicia, e.g. all discs with triangle indicia. A player retrieving a disc that does not help that player achieve a desired set throws that disc away, in one aspect anywhere in a pre-agreed area or field of play, for other players to retrieve. Any particular indicia, e.g. those discs with a question mark indicia, may, optionally, be a "wild card" disc that may be used as a disc of any desired indicia to complete a desired set. Once a set is achieved a play wins; or, as described above for other games and activities, a player who accumulates a desired set may, to win, be required to get to a base, goal, etc. The dummy discs may be used a useless decoys of no point or set value. Such dummy discs (one or more) may be provided for any game or activity disclosed herein. The indicia may be provided on patches by providing the discs with one or more removable patches as described above.

In any game or activity described herein in which a group of players or team accumulates a pre-determined score and/or a pre-determined number of discs or indicia-bearing members and/or a pre-determined set of discs or indicia-bearing members, the team can choose, in certain aspects, one player (or some designated players) to hold the discs or indicia-bearing members as they are accumulated during the game or activity (or to have these items releasably attached to the designated player's clothing, garment, belt, hat, strap, shoe, band, or apparel, etc). The identity of the designated player (or in one aspect two or more designated players) may be revealed at the start of the game or at some pre-set point during the game. Alternatively, the identity of the player(s) may be kept secret until the pre-determined score, number of indicia-bearing members, or set is achieved; or until the player(s) attempt to move to a pre-determined base, goal, or target to "win" the game or activity. In one aspect a player or players may, in any such game or activity according to the present invention, attempt to take from an opposing player (who has qualified to move to a base, goal or target) a disc or discs or an indicia-bearing member so that player no longer is qualified to advance to the base, goal or target.

In any game or activity according to the present invention a pre-determined time limit may be imposed on a player or players for achieving a pre-determined score and/or for retrieving a pre-determined disc or plurality of discs.

Any patch or other indicia-bearing member disclosed herein may be releasably attached to a flying disc with well-known snap apparatus or with the well-known press-fit pop=free apparatus used to releasably attach plastic "flags" to belts used in flag football. In one particular aspect a flying disc itself has the press-fit pop-free apparatus and the disc itself, once retrieved, is releasably attached to a belt or garment with corresponding apparatus (e.g. but not limited to the well-known flag football belt with corresponding apparatus).

In any game or activity according to the present invention in which a score is accorded a person or team for retrieving a disc, a higher score may be awarded for retrieving a disc in flight as opposed to a disc which has touched the floor, ground or water.

The present invention, therefore, provides in certain, but not necessarily all embodiments, a method for at least one first person to interact with at least one second person, the method including the at least one first person throwing a plurality of flying discs, each of the plurality of flying discs bearing identifying indicia, and the at least one second person retrieving at least one of the plurality of flying discs. Such a method may have one, some, or all of the following: wherein the at least one second person is a plurality of second persons; the plurality of second persons competing with each other to retrieve flying discs thrown by the at least one first person; wherein the plurality of second persons comprises at least two separate competing teams, each team including a plurality of persons; wherein the at least one first person is a plurality of first persons; wherein the plurality of first persons comprises a first team and a plurality of second persons comprises a second team; wherein a time taken by the at least one second person to retrieve some, all or at least one of the plurality of flying discs is measured as a time score for the at least one second person; wherein the at least one second person is a plurality of second persons and each of the plurality of second persons who retrieves some, all or at least one of the plurality of flying discs receives a time score corresponding to the time taken to retrieve said disc and/or a numerical score corresponding to numerical indicia on the discs retrieved; wherein the first team throws the plurality of flying discs to the second team and time taken by the second team to retrieve some, one, or at least a portion of the plurality of flying discs is measured and is a time score for the second team and/or numerical score corresponding to numerical indicia on the discs retrieved; wherein the second team then throws a plurality of flying discs to the first team and time taken by the first team to retrieve at least a portion of the plurality of flying discs is measured and is a time score for the first team and/or the first team receives a numerical score corresponding to numerical indicia on retrieved discs; wherein a pre-determined numerical score is to be achieved by a winning team or a pre-determined set of flying discs is to be retrieved by a winning team and the method further comprising the at least one first person throws the plurality of flying discs to at least two separate competing teams, each of the at least two separate competing teams attempt to retrieve flying discs, and the separate competing team that first achieves the pre-determined numerical score or acquires the pre-determined set of flying-discs is the winner; wherein for a separate competing team to be declared the team winner, at least one member of said team becomes a designated member and must have flying discs indicative of the pre-determined numerical score or the pre-determined set of flying discs and said member must move to a pre-selected base with said discs or said patches; wherein a member of an opposing team may attempt to remove at least one of said discs or said patches from said designated member; wherein at least one disc of the plurality of flying discs bears its indicia by bearing an indicia-bearing member releasably attached to the at least one disc; wherein the at least one second person wears a garment (hat, strap, clothing, belt, apparel etc.) and the indicia-bearing member is releasably attachable to the garment; wherein at least one of the plurality of flying discs is releasably attachable to a garment worn by the at least one second persons; wherein the at least one second person receives a score for retrieving at least one of the plurality of flying discs; and/or for any activity or game according to the present invention wherein a score is higher for retrieving a thrown flying disc in flight as opposed to a disc which after throwing touches ground or water before being caught or retrieved.

Figure 5A:
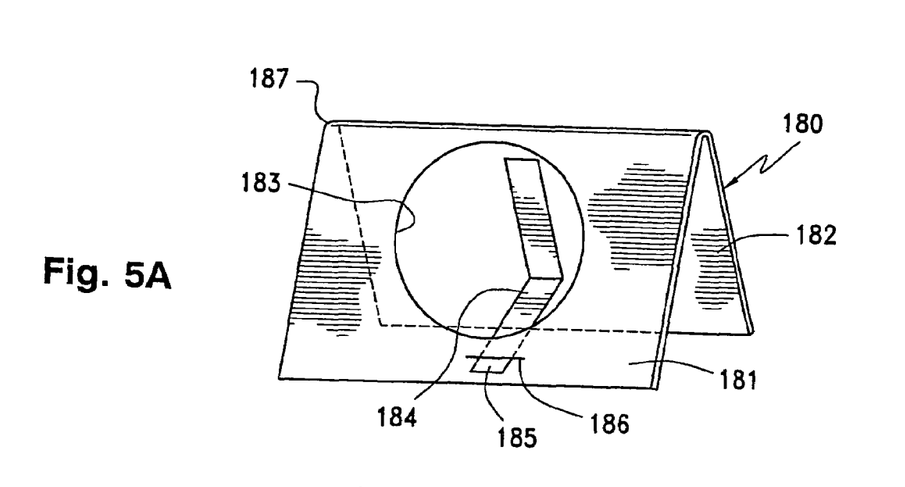
FIG. 5A is a perspective view of a target according to the present invention.
Figure 5B:
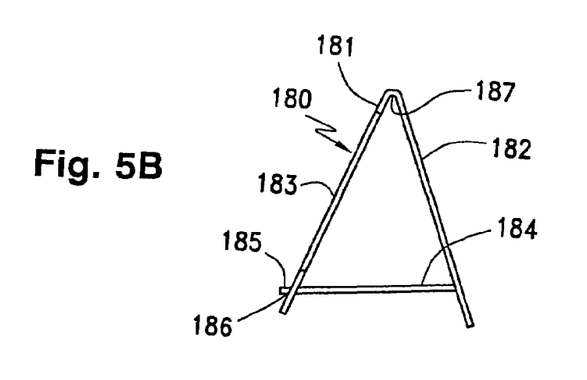
FIG. 5B is a side view of the target of FIG. 5A.

FIGS. 5A and 5B show an upstanding target 180 made from a box with (at least) two opposed sides 181, 182 connected together with a box part 187. A target opening 183 is removed or cut from the side 181. A strip 184 is cut from the side 182 and an end 185 of the strip 184 is inserted through an opening, slot or slit 186. The end 185 may be turned down or twisted to maintain the strip 184 in place. The sides 181, 182 and box part 187 may be of any suitable box material, including, but not limited to cardboard, paperboard, fiberboard, foamboard, craft paper, and manila paper—as may be any box or box part disclosed herein. Alternatively (as may be the case with any box or target disclosed herein), openings may be made in opposed box sides and a piece (or pieces) of box material may be used that passes through each opening. Such a piece of box material is completely separated from a box and is then passed through openings in each of the opposed box sides.

The strip 184 is shown generally centrally located, but it is within the scope of this invention to locate it at any suitable place on the side 182 and/or to use two, three or more such strips. It is also within the scope of this invention to cut one or more such strips from the side 181 and have its (or their) end inserted through a slit, etc. in the side 182. The strip(s) 184 may be any desired length and the target opening 183 may be any desired shape and size (as may be the case with any opening and target disclosed herein). It is within the scope of this invention to provide a box side with two, three, four or more target openings and to provide segmented openings (as may be the case with any opening and target disclosed herein).

Figure 6A:
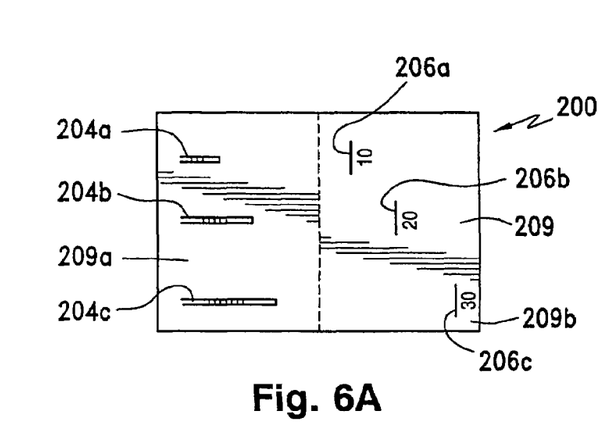
FIG. 6A is a top view of a box for making a target according to the present invention.
Figure 6B:
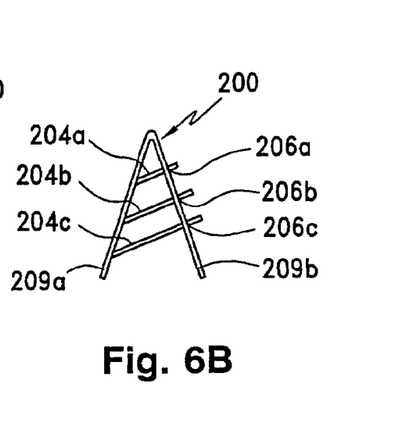
FIG. 6B is a side view of the target of FIG. 6A.

FIGS. 6A and 6B show a target 200 according to the present invention made from box 209 which has three strips 204a, 204b, 204c cut or removed therefrom (with one end remaining integral with the box 209). As shown in FIG. 6B the target 200 is upright with an end portion of each of the strips 204a, 204b, 204c projecting through corresponding openings 206a, 206b, 206c. These projecting end portions provide a projecting target about which a thrown object with a hole therethrough can land, with the hole sufficiently large that the thrown object (which may be any shape disclosed herein as viewed from above with a hole of any shape disclosed herein as viewed from above) can, upon coming to a stop, encompass the projecting end portion of one of the strips 204a, 204b, 204c. It is within the scope of this invention to delete any one or two of the strips 204a, 204b, 204c or to add one, two, three or more such additional strips.

Optionally strips may be designated with scoring indicia, e.g. as the strips are designated with "10" "20" and "30" points in FIG. 20A. Sides 209a, 209b of the box 209 are folded together so the target 200 can stand upright as shown in FIG. 6B.

Figure 7A:
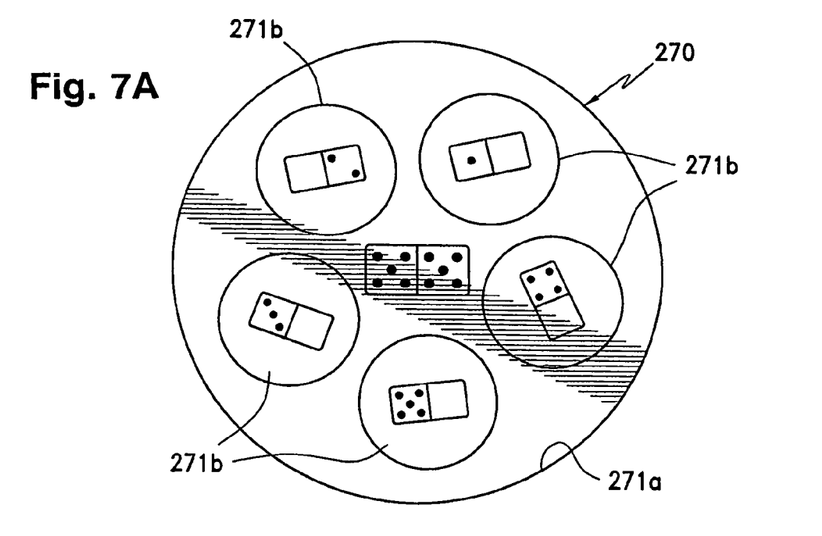
FIG. 7A is a top view of a pattern for a box part for making throwing objects according to the present invention.
Figure 7B:
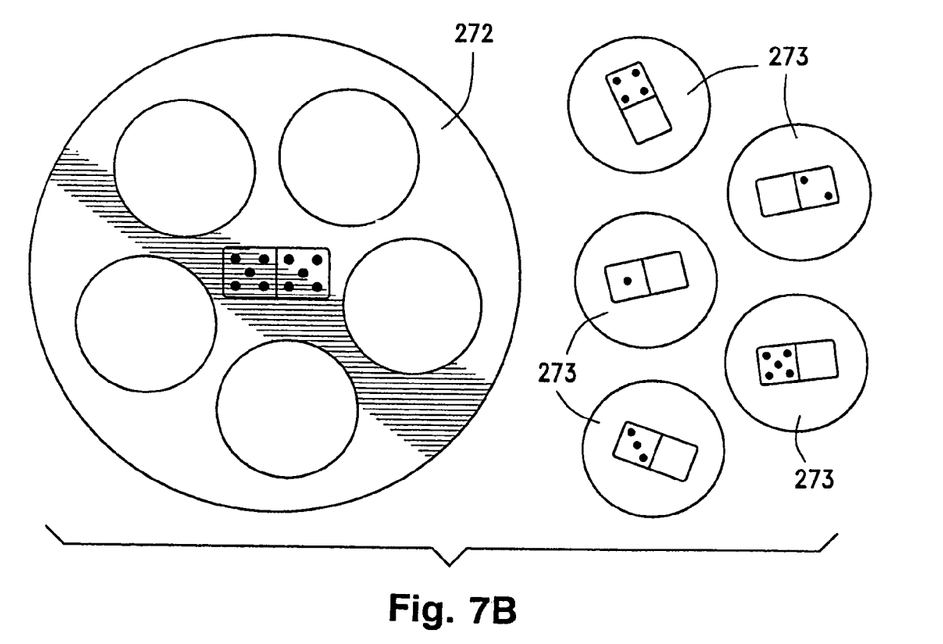
FIG. 7B is a top view of a plurality of throwing objects made with the pattern of FIG. 7A.

FIG. 7A shows a line pattern and scoring indicia indicators (different value domino symbols) for making a plurality of throwing objects (in one embodiment as shown round objects) from part of a box. As shown in FIG. 7B, by severing or cutting a box along lines 271a and 271b (FIG. 7A) throwing objects 272 and 273 are made. Any suitable scoring indicia may be used, including, but not limited to, colors, words, numerals, symbols, or a combination thereof; and the objects may be any desired shape (including any shape referred to herein). Also, the objects may have a thickness of one part of a box or multiple thicknesses may be used (e.g. attached together with glue, tape, staples, and/or interfitting parts).

The prior art and the patent literature disclose aerodynamic flying discs; see, e.g., U.S. Pat. Nos. 3,359,678; 3,724,122; 3,855,728; 4,176,843; 4,802,875; 4,919,083; 5,232,226; 5,263,819; 6,247,989 B1; and 6,585,551 B2—all of these patents incorporated fully herein for all purposes. Aerodynamic flying discs with an upper convex surface and an undercut lower surface—e.g., as shown in the discs of FIGS. 1D, 3A, 13B and 19 herein—have an airfoil shape that creates lift in flight, as is well-known in the prior art and is part of the knowledge of one of ordinary skill in the art. As stated in U.S. Pat. No. 6,247,989: "This configuration leads to a decrease in air pressure above the unit as air passes over the convex upper surface, coupled with an increase in air pressure beneath the unit as air is captured and slowed by the undercut lower surface, which creates lift." This airfoil shape, present (as is evident to one of ordinary skill in the art), e.g., in the discs of FIGS. 1D, 3A, 13B, and 19, is the "airfoil" shape referred to in, e.g., U.S. Pat. Nos. 3,359,678; 3,724,122; and 4,919,083 (U.S. Pat. Nos. 3,359,678 and 4,919,083 incorporated by reference in U.S. Pat. No. 6,585,551).

Figure 19:
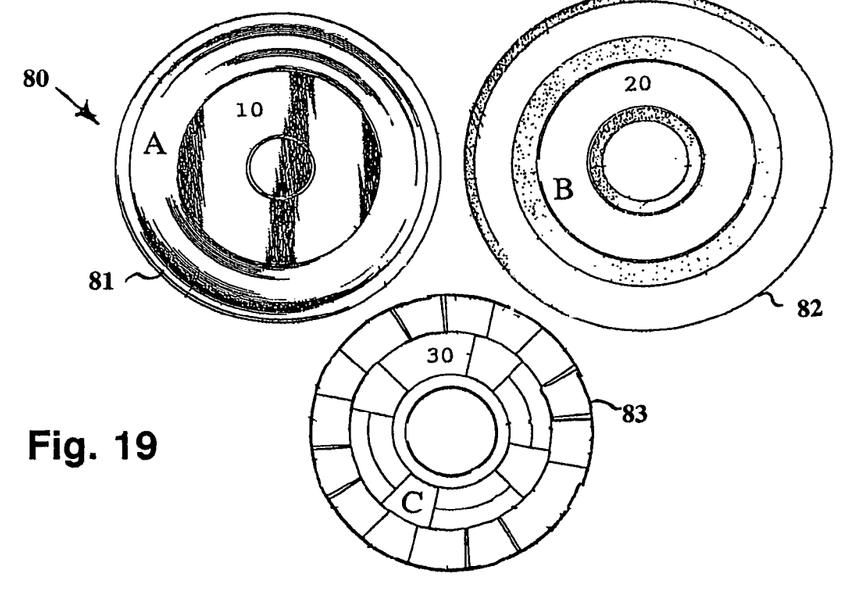
FIG. 19 is a plan view of a set of aerodynamic discs for use in activities according to the present invention.

FIG. 19 shows a set 80 of aerodynamic flying discs according to the present invention. Each disc has an aerodynamic airfoil shape that creates lift in flight and an outer rim that provides stability via a gyroscopic action (which action is well-known in the art, see, e.g., U.S. Pat. No. 5,263,819—and which action is effected by the discs of FIGS. 1D, 3A, 13B and 19). Each disc bears identifying indicia—disc 81, "10;" disc 82, "20;" and disc 83, "30." These particular identifying indicia can be used as numerical score value indicators in any activity or game disclosed or referred to herein, including those in parent applications and patents of this case and the set 80 may be used in these games or activities. Disc 81 has the indicator "A" which may be used to indicate the identity of a player or team that has thrown this disc. Disc 82 has the indicator "B" which may be used to indicate the identity of a player or team that has thrown this disc. Disc 83 has the indicator "C" which may be used to indicate the identity of a player or team that has thrown this disc.

Disc 81 has the structure of discs disclosed in U.S. Pat. No. 3,724,122. Disc 82 has the structure of discs disclosed in U.S. Pat. No. 3,359,678. Disc 83 has the structure of discs disclosed in U.S. Pat. No. 6,247,989 B1. It is within the scope of this invention to: delete any disc from the set 80; add any number of additional discs 81, 82 and/or 83; and to change the identifying indicia and/or score value indicators for one, two, three, or more of the discs to any indicia and/or score value indicators disclosed or referred to herein.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form it may be utilized. The invention claimed herein is new and novel in accordance with 35 U.S.C. § 102 and satisfies the conditions for patentability in § 102. The invention claimed herein is not obvious in accordance with 35 U.S.C. § 103 and satisfies the conditions for patentability in § 103. This specification and the claims that follow are in accordance with all of the requirements of 35 U.S.C. § 112. The inventors may rely on the Doctrine of Equivalents to determine and assess the scope of their invention and of the claims that follow as they may pertain to apparatus not materially departing from, but outside of, the literal scope of the invention as set forth in the following claims.

What is claimed is:

1. A play activity set comprising
an upstanding target at which objects may be directed,
a plurality of objects for throwing at the target, the plurality of objects including at least a first object with a first opening therethrough and a second object with a second opening therethrough,
the target made from box material from at least one box,
the target including a first upright portion with a first end and a second end, a second upright portion with a primary and and a secondary end, the primary end connected to the first end and the second end spaced-apart from the secondary end, the first end above the second end and the primary end above the secondary end,
at least one projection projecting from the second upright portion,
the first opening and the second opening each sufficient to encompass the first projection when thrown at the target
the at least one projection comprising
a first projection,
a second projection, and
a third projection, and
wherein each projection is formed of a part of the same box as the target and part of each projection extends from the first upright portion passes through the second upright portion.

2. The activity set of claim 1 wherein the plurality of objects are made from box material.

3. A play activity set of claim 2 wherein the box material of the target and the box material of the plurality of objects are from a single box.

4. The play activity set of claim 3 wherein the single box comprises a box suitable for containing a pizza.

5. The play activity set of claim 1 wherein the projections project different distances from the upright portion.

6. The play activity set of claim 1 wherein the plurality of objects includes a third object with a third opening, the third opening different in size from the first opening and the second opening, the third opening sufficient to encompass the at least one projection.

7. The play activity set of claim 6 further comprising
the at least one projection includes a first projection and, a second projection, a third projection,
wherein each of the first opening, second opening and third opening are of sufficient size to encompass each of the first projection, second projection, and third projection.

8. The play activity set of claim 6 further comprising
the first opening smaller than the second opening and the second opening smaller than the third opening.

9. The play activity set of claim 1 wherein the at least one projecting portion has scoring indicia designating a score associated therewith.

10. The play activity set of claim 1 wherein the objects of the plurality of objects are throwing discs.

11. The play activity set of claim 1 wherein the first opening is different in size than the second opening.

* * * * *